United States Patent
Wakita et al.

(10) Patent No.: US 11,498,522 B2
(45) Date of Patent: Nov. 15, 2022

(54) VEHICLE CONTROL SYSTEM

(71) Applicant: HONDA MOTOR CO., LTD., Tokyo (JP)

(72) Inventors: Kazuyoshi Wakita, Wako (JP); Michitaka Tsuboi, Wako (JP); Yu Yoshii, Wako (JP); Yuki Sakai, Wako (JP); Ryosuke Oguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 351 days.

(21) Appl. No.: 16/644,075

(22) PCT Filed: Sep. 4, 2017

(86) PCT No.: PCT/JP2017/031851
§ 371 (c)(1),
(2) Date: Mar. 3, 2020

(87) PCT Pub. No.: WO2019/043954
PCT Pub. Date: Mar. 7, 2019

(65) Prior Publication Data
US 2020/0398789 A1    Dec. 24, 2020

(51) Int. Cl.
*B60R 25/25*  (2013.01)
*G06F 21/40*  (2013.01)
*G07C 5/08*   (2006.01)
*B60S 5/00*   (2006.01)
*B60R 25/01*  (2013.01)

(52) U.S. Cl.
CPC .......... *B60R 25/25* (2013.01); *B60S 5/00* (2013.01); *G06F 21/40* (2013.01); *G07C 5/0841* (2013.01); *B60R 25/01* (2013.01)

(58) Field of Classification Search
CPC . B60R 25/25; B60R 25/01; B60S 5/00; G06F 21/40; G06F 21/34; G07C 5/0841; G07C 2205/02; G07C 2209/04; G07C 9/00309; G07C 9/27; G06Q 10/00
See application file for complete search history.

(56) References Cited

U.S. PATENT DOCUMENTS

2017/0284426 A1* 10/2017 Nomura .................. B60R 25/24

FOREIGN PATENT DOCUMENTS

| JP | 2016-118033 A | 6/2016 |
| JP | 2016-172472 A | 9/2016 |
| JP | 2016172472 A * | 9/2016 |

OTHER PUBLICATIONS

PCT/ISA/210 from International Application PCT/JP2017/031851 and the English translation thereof.

* cited by examiner

*Primary Examiner* — Brian P Sweeney
(74) *Attorney, Agent, or Firm* — Carrier Blackman & Associates, P.C.

(57) ABSTRACT

A first authentication process unit and a second authentication process unit of an ECU constituting a system respectively perform a first authentication process and a second authentication process for comparing authentication information acquired from a maintenance operator terminal and a user terminal, and first authentication information of a first authentication information registration unit and second authentication information of a second authentication information registration unit. An authority setting unit performs an operation permission for a vehicle for the purpose of maintaining the vehicle when the authentications match.

10 Claims, 4 Drawing Sheets

VEHICLE CONTROL SYSTEM

TECHNICAL FIELD

The present invention relates to a vehicle control system that permits an authentication target to operate a vehicle on the basis of authentication information obtained from the authentication target.

BACKGROUND ART

For example, regarding a keyless entry system of a vehicle, Japanese Laid-Open Patent Publication No. 2016-172472 discloses that, if authentication between the vehicle and an electronic key has succeeded, operation permission for the vehicle is classified in accordance with an owner, a user, and a maintenance operator of the vehicle corresponding to authentication targets.

SUMMARY OF INVENTION

However, the operation permission for the vehicle for the maintenance operator has the following problems. That is to say, if the maintenance operator with the electronic key corresponding to the authentication target comes close to the vehicle although there is no need for vehicle maintenance from the owner of the vehicle (manager of vehicle), the operation for the vehicle for the vehicle maintenance is permitted through a normal authentication process between the vehicle and the electronic key. On the other hand, in a case where some kind of failure of the vehicle has occurred in the use of the vehicle by a person other than the manager (user of vehicle), if approval for the vehicle maintenance from the manager is necessary, the vehicle maintenance cannot be performed without the approval from the manager. Thus, the necessary maintenance cannot be performed quickly, so that the user may be unable to continue the travel of the vehicle.

The present invention has been made to solve the above problems, and an object is to provide a vehicle control system that can quickly provide vehicle maintenance necessary for a user of a vehicle, and prevent the vehicle maintenance or conversion that is not intended by a manager of the vehicle.

A vehicle control system according to the present invention is configured to permit an authentication target to operate a vehicle on the basis of authentication information obtained from the authentication target, and the vehicle control system includes a first authentication information registration unit, a second authentication information registration unit, a first authentication process unit, a second authentication process unit, and an authority setting unit.

In the first authentication information registration unit, first authentication information used for permitting operation for the vehicle for maintenance of the vehicle is registered. In the second authentication information registration unit, second authentication information used for permitting operation for the vehicle other than the maintenance of the vehicle is registered.

The first authentication process unit is configured to perform a first authentication process for a first authentication target on a basis of authentication information obtained from the first authentication target and the first authentication information registered in the first authentication information registration unit. The second authentication process unit is configured to perform a second authentication process for a second authentication target on a basis of authentication information obtained from the second authentication target and the second authentication information registered in the second authentication information registration unit.

The authority setting unit is configured to permit the operation for the vehicle for the maintenance of the vehicle in a case where both authentication in the first authentication process and authentication in the second authentication process have succeeded.

In this configuration, only if both the authentication in the first authentication process and the authentication in the second authentication process have succeeded, the operation for the vehicle for the vehicle maintenance is permitted. That is to say, unless the authentication for both the first authentication target (maintenance operator) and the second authentication target (operator) has succeeded, the operation for the vehicle maintenance for the maintenance operator is not permitted. Thus, it is possible to quickly provide the vehicle maintenance necessary for a user of the vehicle, and prevent the vehicle maintenance or conversion that is not intended by a manager of the vehicle.

Here, "authentication target" means an object that can be the authentication target in the first authentication process unit and the second authentication process unit. The authentication target includes a failure diagnosis device of the vehicle owned by the maintenance operator, and a mobile device such as a smart key or a smartphone owned by the maintenance operator and the operator. Thus, "authentication information" is not limited to an identification number of the authentication target, and may include biological information of the maintenance operator and the operator.

Moreover, "operation is permitted" means that the authentication target including the maintenance operator or the operator is permitted to perform vehicle operation that is usually necessary for the vehicle in accordance with the kind of the authentication target. For example, as for the maintenance operator, the vehicle operation including the permission to open or close an opening/closing body provided to the vehicle such as a hood of the vehicle or a housing that covers a maintenance target, and the permission to execute reprogramming for an ECU (electronic control unit) is a target of the operation permission.

Here, if the authentications in both the first authentication process and the second authentication process performed on the basis of a request for operation permission for the vehicle for the maintenance of the vehicle have succeeded, the authority setting unit may be configured to permit the operation for the vehicle for the maintenance of the vehicle. Thus, it is possible to prevent the vehicle maintenance or the conversion that is not intended by the manager for sure.

Moreover, it is preferable that the second authentication information may be the authentication information used for permitting the operation for the vehicle for the manager of the vehicle. Furthermore, it is preferable that the second authentication information may be the authentication information used for permitting the operation for the vehicle for the user of the vehicle. Thus, if an abnormal state, for example, vehicle failure occurs and the manager or the user requests maintenance operator's help, only the authentic maintenance operator is permitted to perform the operation for the vehicle.

In this case, the second authentication information may be registered in the second authentication information registration unit as authentication information about a user of the vehicle in a predetermined period including a time point when the second authentication process is performed. Thus, even if the user is different depending on the time, the second authentication process can be performed appropriately.

Moreover, it is preferable that if both the authentication in the first authentication process and the authentication in the second authentication process have succeeded and permission information expressing that a manager of the vehicle has permitted the maintenance of the vehicle is possessed, the authority setting unit may be configured to permit the operation for the maintenance of the vehicle in a first permission range, if both the authentication in the first authentication process and the authentication in the second authentication process have succeeded and the permission information is not possessed, the authority setting unit may be configured to permit the operation for the maintenance of the vehicle in a second permission range, and an operation permission range for the vehicle in the second permission range is more limited than that in the first permission range.

As described above, even if the permission for the vehicle maintenance is not obtained from the manager, the operation for the vehicle maintenance is permitted in the second permission range whose operation permission range for the vehicle is more limited than that in the first permission range in a case where the vehicle maintenance is permitted in the first authentication process and the second authentication process in accordance with the user's need. As a result, for example, even if the failure of the vehicle has occurred, the maintenance operator can perform the vehicle maintenance in the second permission range as an emergency measure for the convenience of the user.

Note that "first permission range" is the operation permission range in which the advanced vehicle maintenance corresponding to the rewriting of the programs of the ECU of the vehicle can also be performed, for example. On the other hand, "second permission range" is the operation permission range in which the limited vehicle maintenance corresponding to the opening and closing operation for the predetermined opening/closing body, for example, the hood of the vehicle or the housing that covers the maintenance target is performed. In the first permission range, since the advanced vehicle maintenance can also be performed, the vehicle maintenance may be permitted in the range of the relatively long time. On the other hand, in the second permission range, since only the vehicle maintenance as the emergency measure can be performed, the vehicle maintenance may be permitted in the range of the relatively short time.

Moreover, if the first authentication target and/or the second authentication target does not exist in a predetermined range after the operation for the maintenance operator is permitted, the authority setting unit may be configured to cancel the operation permission for the maintenance. Thus, it is possible to prevent the maintenance operator from carelessly performing the vehicle maintenance that is not intended by the manager or the user.

Furthermore, even if the first authentication target and/or the second authentication target does not exist in the predetermined range after the operation for the maintenance is permitted, the authority setting unit may be configured to continue the operation permission for the maintenance operator in a case where the permission information expressing that the manager of the vehicle has permitted the maintenance of the vehicle is possessed. Thus, the authentic maintenance operator who has received the operation permission for the maintenance from the manager once can perform the maintenance for the vehicle without requiring another authentication process.

In this case, the first authentication information is registered in the first authentication information registration unit in advance before the first authentication process, or the first authentication information is obtained from a manager server owned by the manager of the vehicle when the first authentication process unit obtains the authentication information from the first authentication target, and registered in the first authentication information registration unit. Moreover, the second authentication information is registered in the second authentication information registration unit in advance before the second authentication process, or the second authentication information is obtained from the manager server when the second authentication process unit obtains the authentication information from the second authentication target, and registered in the second authentication information registration unit. In any cases, the authentication process for the first authentication target and the second authentication target can be performed for sure by using the first authentication information and the second authentication information.

DESCRIPTION OF EMBODIMENT

A preferred embodiment according to the present invention is hereinafter described in detail with reference to the attached drawings.

1. Configuration of the Present Embodiment

Figure 1:
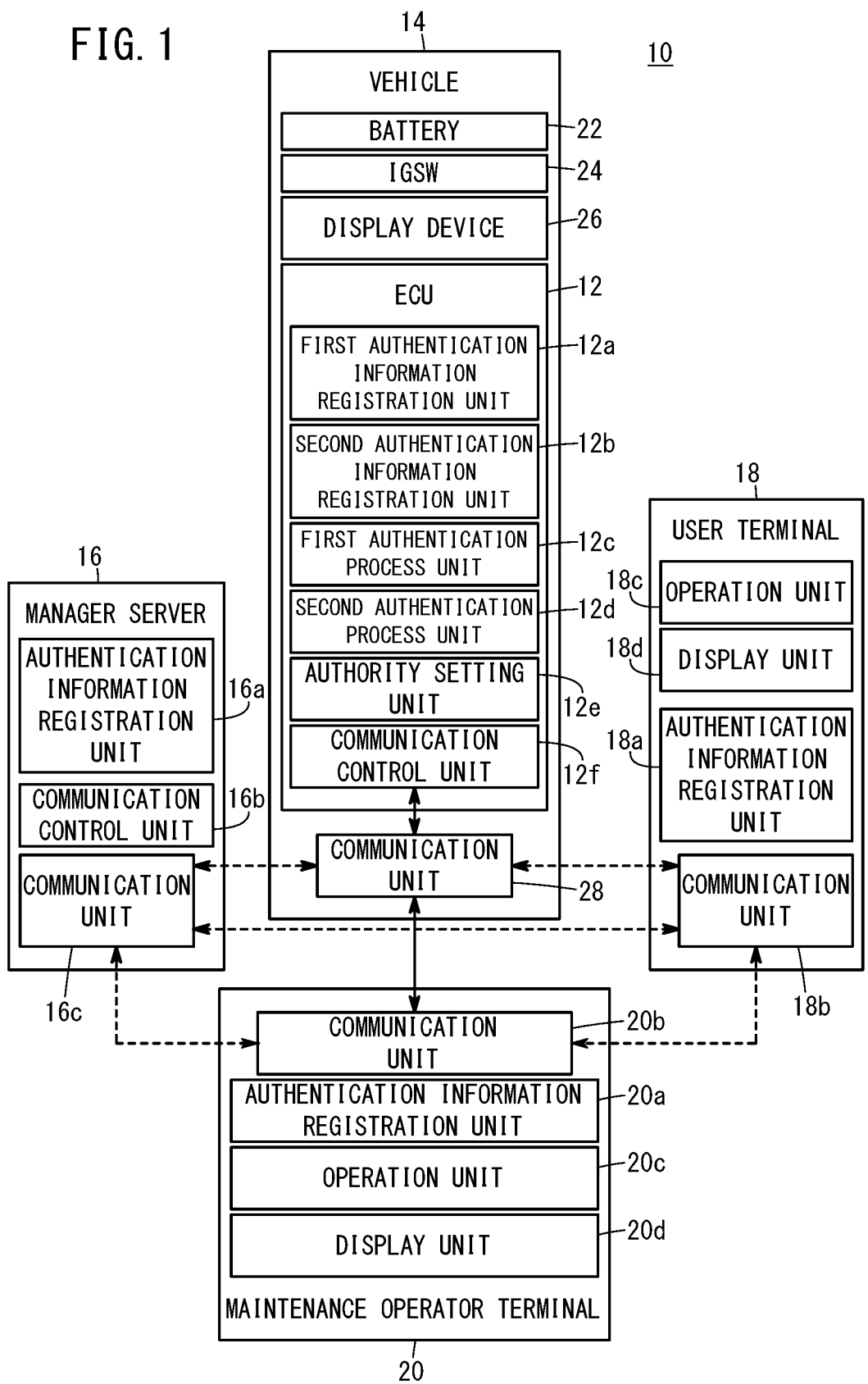
FIG. 1 is a block diagram of a vehicle control system according to an embodiment.

FIG. 1 is a block diagram of a vehicle control system 10 according to the present embodiment (hereinafter, also referred to as system 10 according to the present embodiment). This system 10 is a security system for a vehicle and includes a vehicle 14 including an ECU 12 that performs an authentication process to be described below. For example, this system 10 is applied to a car sharing system in which members registered in advance use the vehicle 14 communally.

The system 10 includes the vehicle 14 owned by a manager (business operator that manages car sharing system, second authentication target), a manager server (second authentication target) 16 owned by the manager, a user terminal (second authentication target) 18 corresponding to a mobile device such as a smart key or a smartphone owned by a user (second authentication target) of the vehicle 14, a failure diagnosis device of the vehicle 14 owned by a maintenance operator (first authentication target) who maintains the vehicle 14, and a maintenance operator terminal (first authentication target) 20 corresponding to a mobile device such as a smart key or a smartphone.

The vehicle 14 is a vehicle such as an automobile that can be used by the user, and includes the ECU 12, a battery 22, an ignition switch 24, a display device 26, and a communication unit 28. In this case, if the user turns on the ignition switch 24, an engine (not shown) is started and power supply from the battery 22 to the ECU 12, the display device 26, and the communication unit 28 is started. The display device 26 is, for example, a navigation device provided to the vehicle 14, and can display various pieces of information output from the ECU 12. The communication unit 28 exchanges signals or information by wire or wireless with the manager server 16, the user terminal 18, and the maintenance operator terminal 20 on the basis of control of the ECU 12. Note that in the present embodiment, the communication unit 28 performs wireless communication with the manager server 16 and the user terminal 18. On the other hand, if the maintenance operator terminal 20 is the failure diagnosis device, the communication unit 28 performs wired communication with the failure diagnosis device through a data link connector (not shown) or the like. Moreover, if the maintenance operator terminal 20 is the smart key or the smartphone, the communication unit 28 performs the wireless communication with these mobile devices.

The ECU 12 is an immobilizer ECU of the vehicle 14 or an engine ECU that also functions as the immobilizer ECU. The ECU 12 includes a first authentication information registration unit 12a, a second authentication information registration unit 12b, a first authentication process unit 12c, a second authentication process unit 12d, an authority setting unit 12e, and a communication control unit 12f. The ECU 12 reads out programs stored in a storage unit (not shown) and executes the programs, so that the functions of the first authentication process unit 12c, the second authentication process unit 12d, the authority setting unit 12e, and the communication control unit 12f are achieved.

The first authentication information registration unit 12a is a memory to which first authentication information (for example, authentication code, authentication key, or biological information of maintenance operator) is registered. The first authentication information specifies the maintenance operator and/or the maintenance operator terminal 20 as the authentication target. Moreover, the second authentication information registration unit 12b is a memory to which second authentication information (for example, authentication code, authentication key, or biological information of manager or user) is registered. The second authentication information specifies the manager, the user, the manager server 16, and/or the user terminal 18 as the authentication target.

Here, the first authentication information is information possessed by the maintenance operator terminal 20 or information possessed by a person who is authorized as the maintenance operator in advance. This first authentication information is used in the authentication process in which a state is changed from a state where vehicle operation for the maintenance of the vehicle 14 is restricted to a state where this vehicle operation is permitted. The first authentication information may be possessed as the biological information by the person who is authorized as the maintenance operator in advance.

"The state is changed from the state where the vehicle operation for the maintenance of the vehicle 14 is restricted to the state where this vehicle operation is permitted" means that the state is changed to a state where the operation for the vehicle 14 necessary for vehicle maintenance, which is usually restricted, is permitted. For example, opening and closing an opening/closing body provided to the vehicle 14 such as a hood of the vehicle 14 or a housing that covers a maintenance target may be permitted, and if the maintenance operator terminal 20 is the failure diagnosis device, executing reprogramming for the ECU 12 through the communication unit 28 may be permitted. Note that if checking the state of the vehicle 14 requires to use the vehicle 14 to some extent, the operation necessary for using the vehicle 14 may be simultaneously permitted partially or entirely.

The second authentication information is information possessed by the user terminal 18 or information possessed by a person who is authorized as the user in advance. This second authentication information is used in the authentication process in which the state is changed from a state where the vehicle operation for using the vehicle 14 is restricted to a state where this vehicle operation is permitted. The second authentication information may be possessed as the biological information by the person who is authorized as the user in advance.

"The state is changed from the state where the vehicle operation for using the vehicle 14 is restricted to the state where this vehicle operation is permitted" means that the state is changed to a state where the operation for the vehicle 14 necessary for using the vehicle 14, which is usually restricted, is permitted. For example, opening and closing a vehicle door for the user to get into the vehicle 14 may be permitted, opening and closing a baggage compartment door may be permitted, and operation for a driving element such as an accelerator pedal, a brake pedal, and a steering wheel for travel of the vehicle 14 and a control switch of a comfortable equipment such as an audio or air conditioner may be permitted.

Moreover, the second authentication information also includes information possessed by the manager server 16 or information possessed by the manager of the vehicle 14. This second authentication information is used in the authentication process in which the state is changed from a state where the vehicle operation for managing the vehicle 14 is restricted to a state where this vehicle operation is permitted. In this case, the second authentication information may be possessed as the biological information by the manager.

"The state is changed from the state where the vehicle operation for managing the vehicle 14 is restricted to the state where this vehicle operation is permitted" means that the state is changed to a state where the operation for the vehicle 14 necessary for managing the vehicle 14, which is usually restricted, is permitted. For example, transmitting or deleting record in a drive recorder mounted on the vehicle 14 may be permitted, and rewriting an identification number of the vehicle 14 may be permitted. Moreover, the manager may be regarded as having the highest authority over the maintenance operator and the user. In this case, the operation necessary for the vehicle maintenance and the operation necessary for using the vehicle 14 may be simultaneously permitted partially or entirely.

Note that in the case where the second authentication information is used in the authentication process in which the state is changed from the state where the vehicle operation for using the vehicle 14 is restricted to the state where this vehicle operation is permitted, it is desirable that the second authentication information may be registered in the second authentication information registration unit 12b as the authentication information about the user of the vehicle 14 in a predetermined period including a time point when a second authentication process to be described below is performed.

If the communication unit 28 has received the authentication information from the maintenance operator terminal 20 by the wired communication, the first authentication process unit 12c performs a first authentication process that determines whether the first authentication information registered in the first authentication information registration unit 12a coincides with the received authentication information. If the communication unit 28 has received the authentication information from the manager server 16 or the user terminal 18 by the wireless communication, the second authentication process unit 12d performs the second authentication process that determines whether the second authentication information registered in the second authentication information registration unit 12b coincides with the received authentication information.

If both the authentication in the first authentication process performed by the first authentication process unit 12c and the authentication in the second authentication process performed by the second authentication process unit 12d have succeeded, the authority setting unit 12e sets operation authority of the maintenance operator who owns the maintenance operator terminal 20 for the vehicle 14. Note that the order of performing the first authentication process and the second authentication process and the order of these processes that have succeeded do not matter. Moreover, design may be performed so that the first authentication process and the second authentication process are performed using a request of the operation permission for the maintenance of the vehicle 14 as a trigger. Note that the request of the operation permission may be a signal transmitted due to any operation of the manager server 16, the user terminal 18, the maintenance operator terminal 20, and the vehicle 14.

The manager server 16 is a server that the manager as the business operator manages, and includes an authentication information registration unit 16a, a communication control unit 16b, and a communication unit 16c. In the authentication information registration unit 16a, each piece of authentication information of the manager server 16, the user terminal 18, and the maintenance operator terminal 20 is registered in advance. Note that in the present embodiment, the user, the maintenance operator, and the manager corresponding to the pieces of authentication information registered in the authentication information registration unit 16a are the authentic user, maintenance operator, and manager, respectively. Moreover, the communication control unit 16b controls the communication unit 16c so as to exchange the signal or the information by the wireless communication with the communication unit 28 of the vehicle 14, the user terminal 18, and the maintenance operator terminal 20.

The user terminal 18 includes an authentication information registration unit 18a, a communication unit 18b, an operation unit 18c, and a display unit 18d. The authentication information of the user terminal 18 is registered in the authentication information registration unit 18a in advance. The communication unit 18b exchanges the signal or the information by the wireless communication with the communication unit 28 of the vehicle 14, the communication unit 16c of the manager server 16, and the maintenance operator terminal 20. The operation unit 18c is an operation button that can be operated by the user. The display unit 18d is a display screen that displays various pieces of information. Note that if the user terminal 18 is the smart key, the display unit 18d is omitted. Moreover, if the user terminal 18 is the smartphone, the operation unit 18c and the display unit 18d are the display screen including a touch screen.

The maintenance operator terminal 20 includes an authentication information registration unit 20a, a communication unit 20b, an operation unit 20c, and a display unit 20d. The authentication information of the maintenance operator terminal 20 is registered in the authentication information registration unit 20a in advance. The communication unit 20b exchanges the signal or the information by the wired communication with the communication unit 28 of the vehicle 14. On the other hand, the communication unit 20b exchanges the signal or the information by the wireless communication with the communication unit 16c of the manager server 16 and the communication unit 18b of the user terminal 18. The operation unit 20c is an operation button that can be operated by the maintenance operator. The display unit 20d is a display screen that displays various pieces of information. Note that if the maintenance operator terminal 20 is the smartphone, the operation unit 20c and the display unit 20d are the display screen including the touch screen.

2. Operation in the Present Embodiment

Operation of the system 10 that is configured as described above is described with reference to FIG. 2. Here, as one example, operation of the authentication process or the like in the ECU 12 is described. In this example, the user uses the vehicle 14 owned by the manager, abnormality, for example, failure of the vehicle 14 occurs, and the user requests maintenance operator's help. Note that in addition to FIG. 2, description is made with reference to FIG. 1, if necessary.

Figure 2:
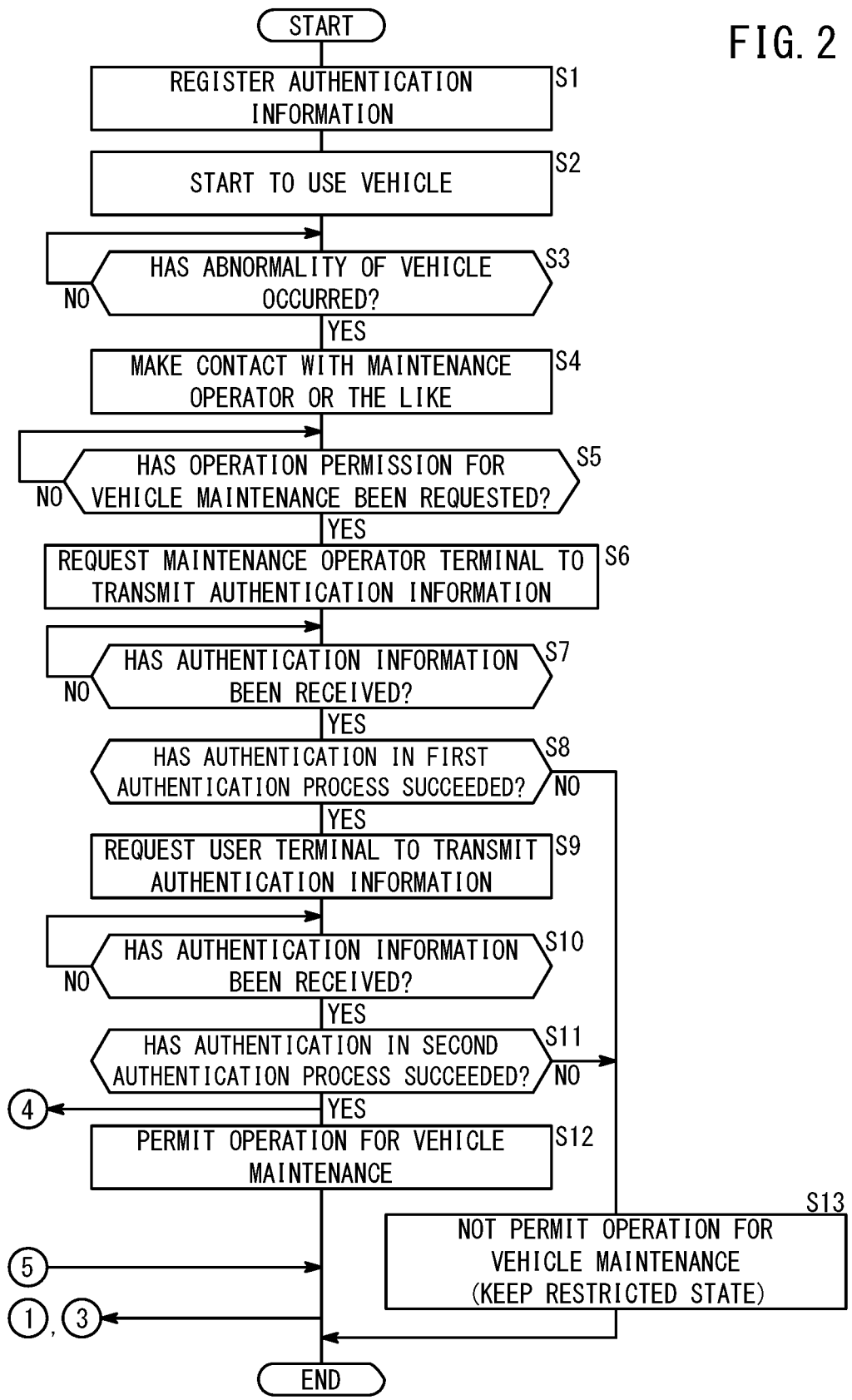
FIG. 2 is a flowchart expressing operation of the vehicle control system in FIG. 1.

First, in a case where the user rents the vehicle 14 from the manager and uses the vehicle 14, in step S1 in FIG. 2, the manager registers the authentication information of the maintenance operator terminal 20 (maintenance operator) as the first authentication information to the first authentication information registration unit 12a (see FIG. 1) of the ECU 12 of the vehicle 14, and registers the authentication information of the manager server 16 (manager) and the user terminal 18 (user) as the second authentication information to the second authentication information registration unit 12b.

Specifically, the manager operates the manager server 16 so as to register each piece of authentication information of the manager server 16, the user terminal 18, and the maintenance operator terminal 20 to the authentication information registration unit 16a in advance. As described above, the authentication information registered in the authentication information registration unit 16a is the authentication information corresponding to the authentic manager, user, and maintenance operator. Thus, the manager server 16 can recognize the user and the maintenance operator corresponding to the authentication information as the regular authentic user and maintenance operator.

The communication control unit 16b of the manager server 16 controls the communication unit 16c so as to transmit each piece of authentication information registered in the authentication information registration unit 16a from the communication unit 16c to the communication unit 28 of the vehicle 14 by the wireless communication. Among the pieces of authentication information received by the communication unit 28, the ECU 12 registers the authentication information of the maintenance operator terminal 20 to the first authentication information registration unit 12a as the first authentication information, and registers the authentication information of the manager server 16 and the user terminal 18 to the second authentication information registration unit 12b as the second authentication information.

Moreover, if maintenance permission information is registered in the authentication information registration unit 16a in advance, the communication control unit 16b may transmit the maintenance permission information from the communication unit 16c to the communication unit 28 of the vehicle 14 by the wireless communication. In this case, the ECU 12 causes the authority setting unit 12e to possess the maintenance permission information received by the communication unit 28. Note that the maintenance permission information is information expressing that the manager permits, in advance, the maintenance operator to perform predetermined maintenance. Thus, it is preferable that operation and the design may be performed so that the authority setting unit 12e possesses the maintenance permission information if the manager predicts that the vehicle 14 needs the predetermined maintenance or if the vehicle 14 needs the predetermined maintenance from a viewpoint of the manager, for example.

In step S2 after the registration of the first authentication information to the first authentication information registration unit 12a and the registration of the second authentication information to the second authentication information registration unit 12b, the user rents the vehicle 14 from the manager and starts to use the vehicle 14.

As described above, the authentication information is registered in the authentication information registration unit 18a of the user terminal 18. Thus, similarly to a known keyless entry system, if the user terminal 18 exists in a predetermined range from the vehicle 14 in step S2, it is possible to unlock the vehicle 14 by performing the authentication process by the wireless communication between the communication unit 18b of the user terminal 18 and the communication unit 28 of the vehicle 14.

That is to say, if the user with the user terminal 18 exists in the predetermined range (for example, communication possible range of communication unit 28) from the vehicle 14, the communication control unit 12f of the vehicle 14 controls the communication unit 28 so as to request the communication unit 18b of the user terminal 18 to transmit the authentication information. If the communication unit 18b has received the transmission request, the communication unit 18b transmits the authentication information registered in the authentication information registration unit 18a to the communication unit 28. The second authentication process unit 12d compares the authentication information received by the communication unit 28 and the authentication information (second authentication information) of the user terminal 18 registered in the second authentication information registration unit 12b. If the both coincide with each other, it is determined that the authentication has succeeded and the vehicle 14 is unlocked.

After that, if the abnormality, for example, the failure of the vehicle 14 has occurred in the use (drive) of the vehicle 14 by the user (step S3: YES), the process advances to step S4. In step S4, the user operates the operation unit 18c of the user terminal 18 and makes contact with the maintenance operator so as to request solution (vehicle maintenance) of the abnormal state, for example, repairing the vehicle 14.

That is to say, the communication unit 18b of the user terminal 18 transmits information (repair request information) in accordance with operation contents of the operation unit 18c by the user to the maintenance operator terminal 20 by the wireless communication. In step S5, if the communication unit 20b of the maintenance operator terminal 20 has received the information from the communication unit 18b of the user terminal 18 (step S5: YES), the display unit 20d displays the received information. Thus, the maintenance operator who owns the maintenance operator terminal 20 watches the display contents of the display unit 20d and determines that there has been the repair request for the vehicle 14, that is, the request for the operation permission for the vehicle maintenance. Then, the maintenance operator with the maintenance operator terminal 20 goes to the vehicle 14. Note that in order to request the maintenance operator to solve the abnormal state, the user terminal 18 may be used as described above, or other devices (public telephone, mobile phone owned by passerby, and the like) may be used.

In step S6, the communication control unit 12f controls the communication unit 28 so as to request the maintenance operator terminal 20 to transmit the authentication information. If the communication unit 20b of the maintenance operator terminal 20 has received the transmission request from the communication unit 28, the communication unit 20b transmits the authentication information registered in the authentication information registration unit 20a to the communication unit 28 by the wireless communication.

In step S7, if the communication unit 28 has received the authentication information from the communication unit 20b of the maintenance operator terminal 20 (step S7: YES), the process advances to step S8. In step S8, the first authentication process unit 12c performs the first authentication process that determines whether the authentication information received from the maintenance operator terminal 20 and the first authentication information registered in the first authentication information registration unit 12a coincide with each other.

In this case, if the authentication information received from the maintenance operator terminal 20 and the first authentication information coincide with each other, that is, if the authentication in the first authentication process has succeeded in the first authentication process unit 12c (step S8: YES), the process advances to step S9.

In step S9, the communication control unit 12f controls the communication unit 28 so as to request the user terminal 18 to transmit the authentication information. If the communication unit 18b of the user terminal 18 has received the transmission request from the communication unit 28, the communication unit 18b transmits the authentication information registered in the authentication information registration unit 18a to the communication unit 28 by the wireless communication.

In step S10, if the communication unit 28 has received the authentication information from the communication unit 18b of the user terminal 18 (step S10: YES), the process advances to step S11. In step S11, the second authentication process unit 12d performs the second authentication process that determines whether the authentication information received from the user terminal 18 and the second authentication information registered in the second authentication information registration unit 12b coincide with each other.

Then, if the authentication information received from the user terminal 18 and the second authentication information coincide with each other, that is, if the authentication in the second authentication process has succeeded in the second authentication process unit 12d (step S11: YES), the process advances to step S12. That is to say, the first authentication process and the second authentication process are performed on the basis of the operation permission request for the vehicle 14 for the maintenance of the vehicle 14 (step S5: YES). Then, only if the authentication in the both processes has succeeded (step S8: YES, step S11: YES), the process advances to step S12.

In step S12, since both the authentication in the first authentication process and the authentication in the second authentication process have succeeded, the authority setting unit 12e determines that the vehicle maintenance should be permitted, and permits the operation for the vehicle 14 for the maintenance of the vehicle 14. That is to say, the authority setting unit 12e permits the vehicle operation (vehicle operation for maintenance of the vehicle 14) in order to solve the abnormal state of the vehicle 14 as follows. Specifically, for example, the opening and the closing of the opening/closing body are permitted by unlocking the opening/closing body provided to the vehicle 14, for example, the hood of the vehicle 14 or the housing that covers the maintenance target, and the reprogramming for the ECU 12 is permitted by unlocking, that is, invalidating a lock flag of the reprogramming for the ECU 12, for example. Thus, the maintenance operator opens or closes the opening/closing body of the vehicle 14, and moreover operates the operation unit 20*c* of the maintenance operator terminal 20, so that the maintenance operator can perform the vehicle maintenance, for example, the reprogramming for the ECU 12 of the vehicle 14 in order to solve the abnormal state of the vehicle 14 from the communication unit 20*b* through the wired communication.

On the other hand, if the authentication in the first authentication process has not succeeded in step S8 (step S8: NO), or if the authentication in the second authentication process has not succeeded in step S11 (step S11: NO), the process advances to step S13.

For example, in a case where the authentication information received from the maintenance operator terminal 20 and the first authentication information do not coincide with each other, or in a case where the maintenance operator terminal 20 does not exist in the predetermined range in which the authentication communication in the first authentication process unit 12*c* is possible (step S8: NO), the process advances to step S13. Alternatively, if the first authentication process has succeeded (step S8: YES) but the second authentication process after steps S9 and S10 has not succeeded (step S11: NO), that is, if the user terminal 18 does not exist in the predetermined range in which the authentication communication in the second authentication process unit 12*d* is possible, the process advances to step S13.

In step S13, the authority setting unit 12*e* determines not to permit the vehicle maintenance on the basis of a determination result corresponding to the fact that the authentication has not succeeded. Then, the authority setting unit 12*e* restricts the operation for the vehicle 14 for the maintenance of the vehicle 14. That is to say, the authority setting unit 12*e* restricts the operation for the vehicle 14 for the vehicle maintenance by preventing the maintenance operator terminal 20 from opening and closing the opening/closing body of the vehicle 14 and unlocking a lock mechanism of the reprogramming for the ECU 12. Thus, the vehicle maintenance or conversion that is not intended by the user or the manager, for example, the careless vehicle maintenance for the vehicle 14 by the maintenance operator can be prevented.

Note that in the above description, after the first authentication process in step S8, the second authentication process in step S11 is performed. In the present embodiment, it is needless to say that the first authentication process may be performed after the second authentication process. In addition, the design may be performed so that the authentication in both the first authentication process and the second authentication process can succeed in a case where all of the first authentication target, the second authentication target, the first authentication process unit 12*c*, and the second authentication process unit 12*d* exist in the predetermined range in which the wireless authentication communication is possible.

3. Modification of the Present Embodiment

Next, modifications (first to fifth modifications) of the above operation are described with reference to FIG. 2 to FIG. 4B.

3.1 First Modification

In the description with reference to FIG. 2, the second authentication information is used in the second authentication process in which the state is changed from the state where the vehicle operation for using the vehicle 14 is restricted to the state where this vehicle operation is permitted. As described above, the second authentication information may be used in the second authentication process in which the state is changed from the state where the vehicle operation for managing the vehicle 14 is restricted to the state where this vehicle operation is permitted.

For example, it is assumed that the system is designed so that, in the process in which the manager operates the vehicle 14 for managing the vehicle 14, if the predetermined maintenance is needed for the vehicle 14, only the predetermined maintenance operator can perform the operation for the predetermined maintenance.

In this case, the use or the like of the vehicle 14 by the user in FIG. 2 is replaced with the management or the use of the vehicle 14 by the manager, and the second authentication information of the manager server 16 and the authentication information that the communication unit 28 has received from the manager server 16 are compared with each other in step S11 in FIG. 2, so that it is possible to determine whether he is the authentic manager or a third party other than the manager. Moreover, in a first modification, similarly to FIG. 2, if the authentication in both the first authentication process and the second authentication process that are performed on the basis of the request for the operation permission for the maintenance of the vehicle 14 has succeeded, the operation for the vehicle 14 for the maintenance of the vehicle 14 is permitted.

3.2 Second Modification

Figure 3A:
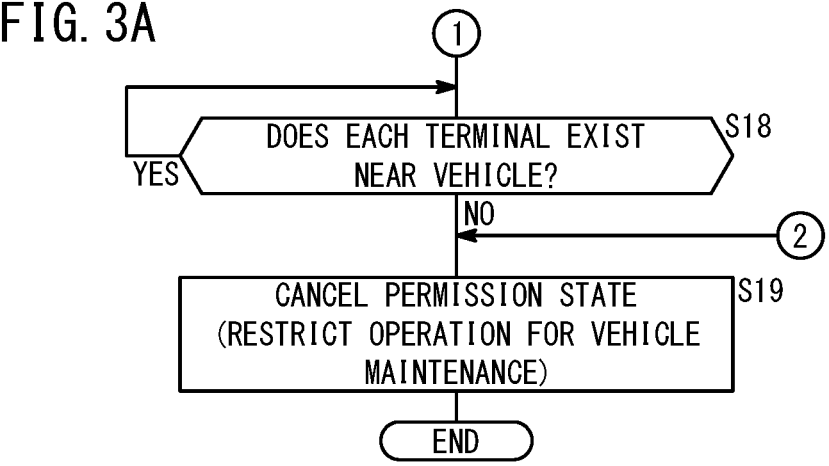
FIG. 3A and FIG. 3B are flowcharts in second and third modifications.

A second modification is described with reference to FIG. 3A. In the second modification, after the operation for the vehicle 14 for the maintenance is permitted in step S12 in FIG. 2, this permission is canceled.

That is to say, in step S18 after step S12, the ECU 12 (first authentication process unit 12*c* and second authentication process unit 12*d* thereof) determines whether the user terminal 18 and/or the maintenance operator terminal 20 does not exist in the predetermined range. In this case, for example, it may be determined whether the user terminal 18 and/or the maintenance operator terminal 20 does not exist in the predetermined range by determining whether the communication between the communication unit 28 and the communication units 18*b*, 20*b* are impossible.

If the user terminal 18 and/or the maintenance operator terminal 20 does not exist in the predetermined range (step S18: NO), the authority setting unit 12*e* restricts the operation for the vehicle 14 for the maintenance of the vehicle 14 in the next step S19. Thus, in a case where the state is changed to a state where only the maintenance operator with the maintenance operator terminal 20 exists alone near the vehicle 14, the user of the vehicle 14 does not exist. Therefore, the state is changed to a state where the operation for the maintenance of the vehicle 14 is not permitted, so that the (careless) vehicle maintenance for the vehicle 14 is prevented. Moreover, if the state is changed to a state where only the user with the user terminal 18 exists alone near the vehicle 14, the operation for the maintenance of the vehicle 14 is not permitted similarly to the case where the maintenance operator exists alone. Thus, the (careless) vehicle maintenance for the vehicle 14 is prevented.

3.3 Third Modification

Figure 3B:
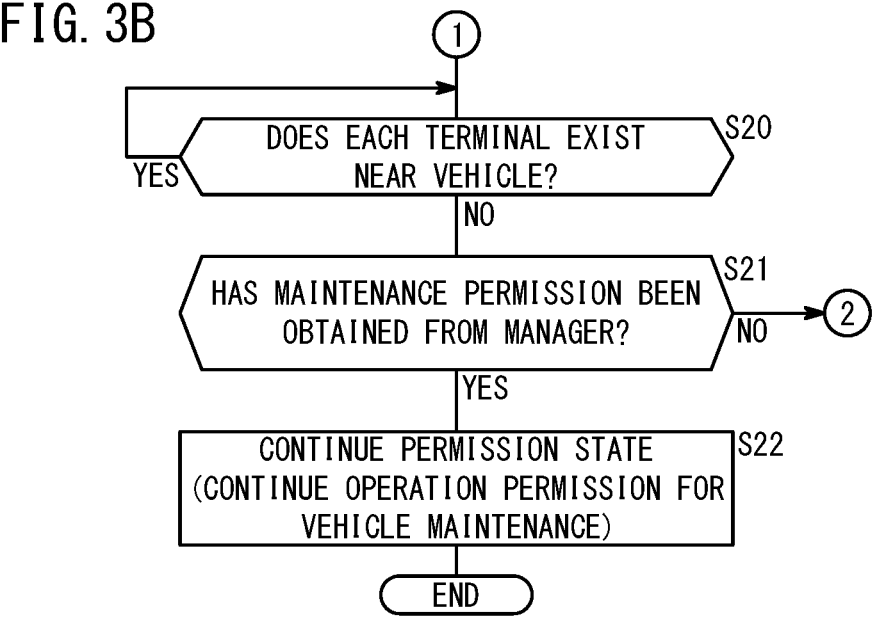

A third modification is described with reference to FIG. 3B. In the third modification, after the operation for the vehicle 14 for the maintenance of the vehicle 14 is permitted in step S12 in FIG. 2, even if the user terminal 18 and/or the maintenance operator terminal 20 does not exist in the predetermined range, the permission state of the operation for the maintenance of the vehicle 14 that was permitted once is kept.

That is to say, in step S20 after step S12, the ECU 12 (first authentication process unit 12c and second authentication process unit 12d thereof) determines whether the user terminal 18 and/or the maintenance operator terminal 20 does not exist in the predetermined range. Moreover, in this case, it may be determined whether the user terminal 18 and/or the maintenance operator terminal 20 does not exist in the predetermined range by the method similar to that in step S18.

If the user terminal 18 and/or the maintenance operator terminal 20 does not exist in the predetermined range (step S20: NO), the authority setting unit 12e determines whether the manager server 16 permits the maintenance of the vehicle 14 after the operation for the maintenance of the vehicle 14 is permitted in step S21.

In this case, the authority setting unit 12e determines whether the maintenance permission information is possessed. If the maintenance permission information is possessed (step S21: YES), the process advances to the next step S22. Note that this maintenance permission information is information that is possessed by the authority setting unit 12e in a case where the user requests the maintenance operator's help, the maintenance operator goes to the vehicle 14 and reports the situation of the vehicle 14 to the manager, and the manager permits the predetermined maintenance on the basis of the report contents.

In step S22, the authority setting unit 12e decides to keep the state where the operation for the vehicle 14 for the maintenance of the vehicle 14 is permitted on the basis of an affirmative determination result in step S21. Thus, even in a case where the user with the user terminal 18 goes away from the vehicle 14 and the state is changed to the state where the maintenance operator with the maintenance operator terminal 20 exists alone near the vehicle 14, the state where the vehicle operation for the maintenance of the vehicle 14 is permitted can be continued if the manager (manager server 16) permits the operation for the maintenance of the vehicle 14. As a result, the suitable vehicle maintenance can be provided while making the user feel convenient. That is to say, the user may go away from the vehicle 14 in the middle of the maintenance, for example.

On the other hand, in step S21, if the authority setting unit 12e does not possess the maintenance permission information (step S21: NO), the authority setting unit 12e cancels the permission of the operation for the vehicle maintenance and restricts this operation in step S19 in FIG. 3A.

3.4 Fourth Modification

Figure 4A:
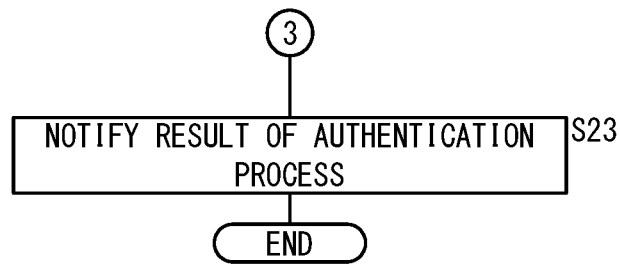
FIG. 4A and FIG. 4B are flowcharts in fourth and fifth modifications.

A fourth modification is described with reference to FIG. 4A. In the fourth modification, in a case where the state is changed from the state where the vehicle operation for the maintenance of the vehicle 14 is restricted to the state where this vehicle operation is permitted in step S12 in FIG. 2, or the state where the vehicle operation is restricted is continued in step S13, this result is notified to the manager server 16, the user terminal 18, and the maintenance operator terminal 20. That is to say, in step S23 after steps S12, S13, the communication unit 28 transmits the process result in the authority setting unit 12e to each of the communication units 16c, 18b, 20b by the wireless communication.

Thus, in the user terminal 18, the display unit 18d displays the notification contents received by the communication unit 18b. The user can identify whether the operation for the maintenance of the vehicle 14 is permitted or restricted by checking the display contents in the display unit 18d.

In addition, in the maintenance operator terminal 20, the display unit 20d displays the notification contents received by the communication unit 20b. The maintenance operator can identify whether the operation for the maintenance of the vehicle 14 is permitted or restricted by checking the display contents in the display unit 20d.

3.5 Fifth Modification

Figure 4B:
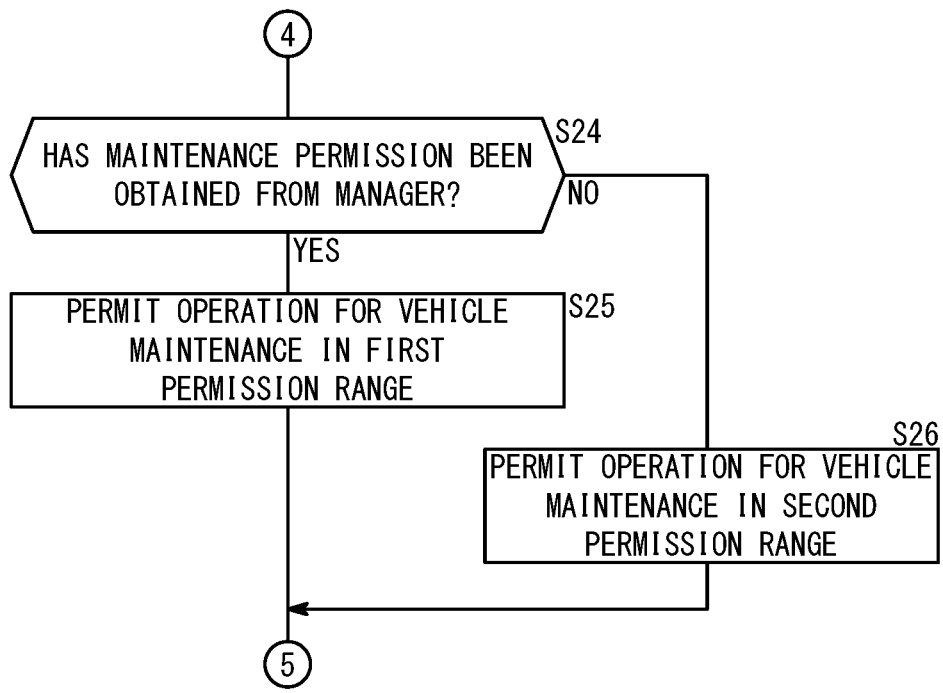

A fifth modification is described with reference to FIG. 4B. In the fifth modification, in a case where the determination result is affirmative in step S11 in FIG. 2 and the authority setting unit 12e permits the operation for the maintenance of the vehicle 14, operation contents and the time to be permitted are set in accordance with the presence or absence of the manager's permission for the vehicle maintenance (whether maintenance permission information is possessed).

Specifically, if the determination result is affirmative in step S11 in FIG. 2 (step S11: YES), the process advances to step S24 in FIG. 4B. In step S24, the authority setting unit 12e determines whether the maintenance permission information is obtained from the manager server 16 in advance and is possessed. Note that this maintenance permission information is information expressing that the manager has permitted the maintenance operator to perform the predetermined maintenance in advance. Thus, it is preferable that the design may be performed so that the authority setting unit 12e possesses the maintenance permission information if the manager predicts that the vehicle 14 needs the predetermined maintenance or if the vehicle 14 needs the predetermined maintenance from the viewpoint of the manager.

In step S24, if the maintenance permission information for the maintenance operator terminal 20 is possessed (step S24: YES), the authority setting unit 12e permits the operation for the vehicle maintenance in a first permission range that is set in advance as the permission operation for the maintenance of the vehicle 14 in the next step S25. Note that the first permission range includes, as permission contents, the advanced vehicle maintenance operation, for example, the rewriting of the programs of ECU 12.

On the other hand, in step S24, if the maintenance permission information for the maintenance operator terminal 20 is not possessed (step S24: NO), that is, if the maintenance operator terminal 20 does not receive the maintenance permission from the manager server 16, the authority setting unit 12e permits the operation for the vehicle maintenance in a second permission range that is set in advance as the permission operation for the maintenance of the vehicle 14 in the next step S26. Note that the second permission range includes, as the permission range, only the limited vehicle maintenance operation, that is, the opening and closing operation for the predetermined opening/closing body, for example, the hood of the vehicle 14 or the housing that covers the maintenance target. That is to say, the permission range for the operation (maintenance) of the vehicle 14 in the second permission range is more limited than that in the first permission range.

Thus, even if the manager server 16 has not permitted the vehicle maintenance, the maintenance operator can perform the vehicle maintenance in the second permission range in accordance with the user's need to solve the comparatively minor failure or the like of the vehicle 14 as an emergency measure for the convenience of the user.

Note that as described in the above example, the first permission range and the second permission range may be classified depending on whether the operation contents permitted for the vehicle maintenance is advanced or not. Alternatively, the both may be classified depending on whether the time permitted for the vehicle maintenance is long or short, or both classification may be employed. That is to say, in the first permitted range, the advanced vehicle maintenance can also be performed. Thus, the vehicle maintenance may be permitted in the range of the relatively long time, for example, twelve hours. In the second permission range, the minimum vehicle maintenance, for example, the emergency measure is permitted. Thus, the vehicle maintenance may be permitted in the range of the relatively short time, for example, three hours.

4. Effects of the Present Embodiment

As described above, in the system 10 according to the present embodiment, the operation for the vehicle 14 for the maintenance of the vehicle 14 is permitted in the case where both the authentication in the first authentication process and the authentication in the second authentication process have succeeded. That is to say, unless the authentication for both the maintenance operator terminal 20 (maintenance operator) and the user terminal 18 (user) or the manager server 16 (manager) has succeeded, the operation for the maintenance of the vehicle 14 for the maintenance operator is not permitted. Thus, it is possible to quickly provide the vehicle maintenance necessary for the user of the vehicle 14, and prevent the vehicle maintenance or the conversion that is not intended by the manager of the vehicle 14.

In this case, only if the authentication in both the first authentication process and the second authentication process has succeeded after both the processes are performed on the basis of the request for the operation permission for the vehicle 14 for the maintenance of the vehicle 14, the authority setting unit 12e may permit the operation for the vehicle 14 for the maintenance of the vehicle 14. Thus, it is possible to prevent the vehicle maintenance or the conversion that is not intended by the manager of the vehicle 14 for sure.

Moreover, the second authentication information is the authentication information used for permitting the operation for the vehicle 14 for the user or the manager of the vehicle 14. Thus, if the abnormal state, for example, the failure of the vehicle 14 occurs and the user or the manager requests the maintenance operator's help, only the authentic maintenance operator is permitted to perform the operation for the vehicle 14.

Moreover, the second authentication information is registered in the second authentication information registration unit 12b as the authentication information about the user of the vehicle 14 in the predetermined period including the time point when the second authentication process is performed. Thus, even if the user is different depending on the time, the second authentication process can be performed appropriately.

Moreover, even if the permission for the vehicle maintenance (maintenance permission information) is not obtained from the manager, the authority setting unit 12e permits the operation for the maintenance of the vehicle 14 in the second permission range whose operation permission range for the vehicle 14 is more limited than that in the first permission range in the case where the vehicle maintenance is permitted in the first authentication process and the second authentication process in accordance with the user's need. Thus, for example, even if the failure of the vehicle 14 has occurred, the maintenance operator can perform the vehicle maintenance in the second permission range as the emergency measure for the convenience of the user.

Moreover, if the maintenance operator terminal 20 and/or the user terminal 18 (manager server 16) does not exist in the predetermined range after the operation for the maintenance operator is permitted, the authority setting unit 12e is configured to cancel the operation permission for the maintenance operator. Thus, it is possible to prevent the maintenance operator from carelessly performing the vehicle maintenance that is not intended by the user or the manager.

Furthermore, even if the maintenance operator terminal 20 and/or the user terminal 18 (manager server 16) does not exist in the predetermined range after the operation for the maintenance operator is permitted, the authority setting unit 12e is configured to continue the operation permission for the maintenance operator in the case where the maintenance operator obtains the maintenance permission of the vehicle 14 from the manager of the vehicle 14 (possesses maintenance permission information). The authentic maintenance operator who has received the operation permission for the maintenance from the manager once can perform the maintenance for the vehicle 14 without requiring another authentication process.

Moreover, before the first authentication process and the second authentication process by the first authentication process unit 12c and the second authentication process unit 12d, the first authentication information and the second authentication information are registered in the first authentication information registration unit 12a and the second authentication information registration unit 12b in advance, or when each piece of the authentication information is received from the maintenance operator terminal 20 and the user terminal 18 (manager server 16), the first authentication information and the second authentication information are obtained from the manager server 16 and registered in the first authentication information registration unit 12a and the second authentication information registration unit 12b. In any cases, the first authentication process and the second authentication process for the maintenance operator terminal 20 and the user terminal 18 (manager server 16) can be performed for sure by using the first authentication information and the second authentication information.

The present invention is not limited to the above embodiment and may employ various configurations on the basis of the description in the present specification.

The invention claimed is:

1. A vehicle control system configured to permit an authentication target to operate a vehicle on a basis of authentication information obtained from the authentication target, the vehicle control system comprising one or more processors that execute computer-executable instructions stored in a memory:

wherein the one or more processors execute the computer-executable instructions to cause the vehicle control system to:
register first authentication information used for permitting operation for the vehicle for maintenance of the vehicle in a first authentication information registration unit;
register second authentication information used for permitting operation for the vehicle other than the maintenance of the vehicle in a second authentication information registration unit;
perform a first authentication process for a first authentication target on a basis of authentication information obtained from the first authentication target and the first authentication information registered in the first authentication information registration unit;
perform a second authentication process for a second authentication target on a basis of authentication information obtained from the second authentication target and the second authentication information registered in the second authentication information registration unit; and
permit the operation for the vehicle for the maintenance of the vehicle in a case where both authentication in the first authentication process and authentication in the second authentication process have succeeded.

2. The vehicle control system according to claim 1, wherein if the authentications in both the first authentication process and the second authentication process performed on the basis of a request for operation permission for the vehicle for the maintenance of the vehicle have succeeded, the one or more processors cause the vehicle control system to permit the operation for the vehicle for the maintenance of the vehicle.

3. The vehicle control system according to claim 1, wherein the second authentication information is authentication information used for permitting the operation for the vehicle for managing the vehicle.

4. The vehicle control system according to claim 1, wherein the second authentication information is authentication information used for permitting the operation for the vehicle for using the vehicle.

5. The vehicle control system according to claim 4, wherein the second authentication information is registered in the second authentication information registration unit as authentication information about a user of the vehicle in a predetermined period including a time point when the second authentication process is performed.

6. The vehicle control system according to claim 4, wherein:
if both the authentication in the first authentication process and the authentication in the second authentication process have succeeded and permission information expressing that a manager of the vehicle has permitted the maintenance of the vehicle is possessed, the one or more processors cause the vehicle control system to permit the operation for the maintenance of the vehicle in a first permission range;
if both the authentication in the first authentication process and the authentication in the second authentication process have succeeded and the permission information is not possessed, the one or more processors cause the vehicle control system to permit the operation for the maintenance of the vehicle in a second permission range; and
an operation permission range for the vehicle in the second permission range is more limited than that in the first permission range.

7. The vehicle control system according to claim 1, wherein if the first authentication target and/or the second authentication target does not exist in a predetermined range after the operation for the maintenance is permitted, the one or more processors cause the vehicle control system to cancel the operation permission for the maintenance.

8. The vehicle control system according to claim 1, wherein even if the first authentication target and/or the second authentication target does not exist in the predetermined range after the operation for the maintenance is permitted, the one or more processors cause the vehicle control system to continue the operation permission for the maintenance in a case where the permission information expressing that the manager of the vehicle has permitted the maintenance of the vehicle is possessed.

9. The vehicle control system according to claim 1, wherein:
the first authentication information is registered in the first authentication information registration unit in advance before the first authentication process, or the first authentication information is obtained from a manager server owned by the manager of the vehicle when the authentication information is obtained from the first authentication target, and registered in the first authentication information registration unit; and
the second authentication information is registered in the second authentication information registration unit in advance before the second authentication process, or the second authentication information is obtained from the manager server when the authentication information is obtained from the second authentication target, and registered in the second authentication information registration unit.

10. The vehicle control system according to claim 1, wherein
the first authentication process is performed by wireless communication between a communication unit of the vehicle and a communication unit of the first authentication target within a predetermined range from the vehicle,
the second authentication process is performed by wireless communication between the communication unit of the vehicle and a communication unit of the second authentication target within the predetermined range from the vehicle, and
the operation for the vehicle for the maintenance of the vehicle is permitted if both the first authentication target and the second authentication target exist within the predetermined range from the vehicle.

* * * * *